(12) United States Patent
Mullen

(10) Patent No.: US 9,006,617 B2
(45) Date of Patent: Apr. 14, 2015

(54) WIRELESS ELECTRIC HEAT TRACE AND VIBRATION CONTROL AND MONITORING SYSTEM

(76) Inventor: Timothy Russell Mullen, South Grafton, MA (US)

(*) Notice: Subject to any disclaimer, the term of this patent is extended or adjusted under 35 U.S.C. 154(b) by 1067 days.

(21) Appl. No.: 12/967,980

(22) Filed: Dec. 14, 2010

(65) Prior Publication Data
US 2011/0163082 A1 Jul. 7, 2011

Related U.S. Application Data

(63) Continuation-in-part of application No. 12/286,732, filed on Oct. 1, 2008.

(60) Provisional application No. 60/976,601, filed on Oct. 1, 2007.

(51) Int. Cl.
| | |
|---|---|
| *H05B 1/02* | (2006.01) |
| *G05B 23/02* | (2006.01) |
| *H04Q 9/00* | (2006.01) |

(52) U.S. Cl.
CPC .......... *H05B 1/0291* (2013.01); *G05B 23/0275* (2013.01); *H05B 1/023* (2013.01); *H04Q 2209/25* (2013.01); *H04Q 9/00* (2013.01)

(58) Field of Classification Search
CPC .............. H05B 1/02; G08B 1/00; G08B 1/08; G08C 17/00; G08C 19/00; H04W 24/00; H04W 24/02; H04W 24/04; G06F 15/16; G06F 11/00; G05B 23/00; G05B 23/02

USPC .......... 219/494; 374/152; 340/539.1, 539.13, 340/539.17, 539.26, 539.27, 531
See application file for complete search history.

(56) References Cited

U.S. PATENT DOCUMENTS

| | | | | |
|---|---|---|---|---|
| 5,225,766 | A | * | 7/1993 | O'Neill .......................... 323/280 |
| 5,907,491 | A | * | 5/1999 | Canada et al. ................. 700/108 |
| 2002/0180610 | A1 | * | 12/2002 | Pedoeem et al. .............. 340/635 |
| 2004/0217847 | A1 | * | 11/2004 | Fries et al. .................... 340/7.21 |
| 2006/0185612 | A1 | * | 8/2006 | Bonner et al. ................. 119/455 |
| 2007/0080149 | A1 | * | 4/2007 | Albrecht et al. .......... 219/130.01 |

* cited by examiner

*Primary Examiner* — Brian Jennison
(74) *Attorney, Agent, or Firm* — Gerry A. Blodgett; David J. Blodgett; Blodgett & Blodgett, P.C.

(57) ABSTRACT

A monitoring system for monitoring the temperature and vibration of equipment, comprising a central digital computer, a MESH communication network, wherein the network feeds signals to the central digital computer, a plurality of heating elements for heating the equipment, temperature/vibration sensors adapted to measure the temperature of the equipment, wherein each sensor is adapted to provide a signal representing the temperature/vibration of the piece of equipment to which the sensor is associated, to the network, wherein each temperature/vibration sensor can also be used to control the electric heaters, a temperature sensor that monitors the ambient temperature of the facility, and current transducers associated with the heaters, to monitor the energy use and current loss of the heaters, wherein the central computer uses the data it receives from the other elements of the monitoring system to determine when the equipment is not at the correct temperature/vibration and diagnoses the reason why.

10 Claims, 3 Drawing Sheets

WIRELESS ELECTRIC HEAT TRACE AND VIBRATION CONTROL AND MONITORING SYSTEM

CROSS-REFERENCE TO RELATED APPLICATIONS

This application claims the benefit under 35 U.S.C. section 119(e) of U.S. Provisional patent application No. 60/976,601 filed Oct. 1, 2007, and this application is a continuation of and claims the benefit under 35 U.S.C. section 120, of U.S. patent application Ser. No. 12/286,732, filed Oct. 1, 2008, now pending, all of both of which are hereby incorporated by reference.

STATEMENT REGARDING FEDERALLY SPONSORED RESEARCH OR DEVELOPMENT

This invention has been created without the sponsorship or funding of any federally sponsored research or development program.

REFERENCE TO SEQUENCE LISTING, A TABLE, OR A COMPUTER PROGRAM LISTING COMPACT DISK APPENDIX

Not applicable.

THE FIELD OF THE INVENTION

This invention involves a system for monitoring the operation of equipment used to heat and operate industrial equipment.

BACKGROUND OF THE INVENTION

It is common to use an electric heat trace system in various industrial processes. In the operation of many different types of industrial plants (power generation, pulp and paper, chemical, etc) there exists the need to deploy electric heat trace systems. The purpose of an electric heat trace system is to prevent pipe freeze up when temperatures fall, and/or to maintain process pipe temperature for process efficiencies. If either of these conditions occur (pipe freeze or process media temperature decline), the result can have serious impact upon the ability of the plant to operate at proper efficiency, or to have the plant operate at all. Additionally, once one of these conditions has taken place, it requires immediate attention and significant time from plant personnel to resolve the issue. Since these conditions are always an "upset" and never a "scheduled occurrence", they normally take personnel away from doing constructive and revenue generating activities. Therefore, when an electric heat trace system fails to keep pipes from freezing or from maintaining a set process temperature, it is always a double loss to the operations of the plant. For one thing the heat trace system failure causes lost revenues from poor or non-existent operations. Furthermore, the heat trace system failure causes lost wages for utilizing plant personnel on non-productive activities.

There are several objectives of a properly functioning electric heat trace system. The real value of a properly functioning electric heat trace system is that it should be acting as "ensurance" against catastrophic failures, maintaining critical process availability, and providing for ease of maintenance and troubleshooting should a problem occur. The benefit to the day-to-day operations is to allow Plant Management the higher value use of their skilled, trained and knowledgeable Technicians. Fixing the problems caused by a frozen pipe, as an example, is NOT the best use of the limited resources (highly trained Technicians) of most industrial plants. And most importantly, whenever an upset occurs, it causes a potential deficiency in the revenue opportunity to the plant. Whether it is a total inability of the plant to operate (i.e. drum level control transmitter at a power plant freezes, creating a "zero" reading thereby not allowing the plant control system to "fire" the boiler) or simply a process temperature not being maintained (i.e. coconut oil component of a chocolate manufacturer being too cold to maintain desired flow rates causing severe delays in the manufacturing cycle), malfunctioning electric heat trace systems can create significant problems and potential losses for industrial plants.

The realities of most industrial plants are not ideal. Even with the potential problems identified to the plant, its personnel, and its profits, the realities of most systems is that the heat trace is often the "last item" on a project and the budget is nearly gone when it is time to specify the proper hardware and installation of the electric heat trace system. This inevitably leads to poor practices in the design and execution of the system, such as multiple circuits per breaker; poorly labeled breaker panel/line list due to changes in field; ineffective design (not enough watts/foot for pipe size; for insulation type and thickness; etc); and little thought given to operating functionality and maintenance concerns.

Electric heat trace systems, even with proper design and specification, can still malfunction once installed in the field. There are several common causes of these malfunctions. One common cause is moisture intrusion from poor installation practices (leaky junction boxes; leaky conduit; leaky insulation barriers; etc), and Insulation problems (poor installation; poor re-installation; environmental moisture). Another common cause is maintenance on operating devices (valves, pumps, etc) that leads to broken or damaged lines.

With the recognition of how important a properly functioning electric heat trace system can be to the operations and profitability of a plant, and with the knowledge that even a properly designed and installed system can develop problems over time, monitoring the "health" of the electric heat trace system is critical.

Control and Monitoring Systems: The objective of an electric heat trace control and monitoring system is simple—to alert plant personnel BEFORE a problem occurs that could cause a catastrophic failure, interrupt critical process availability, or diminish plant revenue generation; and to build in the control logic in order to turn on or turn off specific electric heat trace circuits based upon the input signals received into the control system.

The monitoring systems currently available can be as primitive as a simple LED on the end of an electric heat trace circuit (indication of voltage at the LED), to a sophisticated pipe temperature-sensing and breaker current-sensing multiple circuit system. Most systems fall somewhere in between, with the most common having local visual indication as the primary method of alarm. Although local visual indication is the most common alarming method, it is also the least effective.

No matter the complexity or the simplicity of today's control and monitoring systems, they all suffer from one inherent drawback, and that is that they must all be "hard wired." Hard wired monitoring systems are permanent "in place" systems and require the same infrastructure and installation issues (electrical code requirements, installation labor, etc) as does any electrical project. These costs are significant when included as part of the original electrical heat trace project, but they grow by a factor of 2× to 3× when a Monitoring System is added after an initial electric heat trace system has been installed. Because of the cost of installation of these monitoring systems (whether as part of the original project, or when considered as an additional "ensurance" measure later), many of the systems get reduced in size and/or capabilities, thus reducing their overall effectiveness, and decreasing their ability to meet the intended objective—to warn personnel BEFORE a problem occurs.

Similar issues occur in vibration problems. WIRELESS VIBRATION MONITORING SYSTEM: Benefits to the Customer: A. What is "VIBRATION MONITORING" and why is it used? In the operation of many different types of industrial plants (power generation, pulp and paper, chemical, etc) there exists the need to deploy vibration monitoring systems. The purpose of a vibration monitoring system is to prevent failure of rotating equipment from vibration. The vibration is normally caused by an "out of balance" condition in some part of the rotating equipment. Typical equipment that could be monitored are process pumps, large fans, and large electric motors. If this type of equipment fails, the result can have serious impact upon the ability of the plant to operate at proper efficiency, or to have the plant operate at all. Additionally, once a failure has occurred, it requires immediate attention and significant time from plant personnel to resolve the issue. Since these conditions are always an "upset" and never a "scheduled occurrence", they normally take personnel away from doing constructive and revenue generating activities. Therefore, when a critical piece of equipment fails due to a bearing issue, overheating issue, process media leakage issue, or other issue due to a vibration problem, it is always a double loss to the operations of the plant due to lost revenues from poor or non-existent operations, and lost wages for utilizing plant personnel on non-productive activities.

B. Objectives of a properly functioning vibration monitoring system: The real value of a properly functioning vibration monitoring system is that it should be acting as "ensurance" against catastrophic failures, maintaining critical process availability, and providing for a "predictive maintenance versus reactive maintenance" capability within an industrial facility. A significant benefit to the day-to-day operations is to allow Plant Management the higher value use of their skilled, trained and knowledgeable Technicians. Fixing the problems caused by a failed bearing, as an example, is NOT the best use of the limited resources (highly trained Technicians) of most industrial plants. And most importantly, whenever an upset occurs, it causes a potential deficiency in the revenue opportunity to the plant. Whether it is a total inability of the plant to operate (i.e. critical ventilation fan failure for a monitored "air-changes-per-minute" paint room) or simply a pump failing to move as much material as is specified due to a worn out bearing, un-monitored rotating equipment systems can create significant problems and potential losses for industrial plants.

C. Realities of Most Operating Plants: Even with the potential problems identified to the plant, its personnel, and its profits, the realities of most industrial plants is that the vibration monitoring is only performed on a scheduled basis—not on a continuous "live" basis. Plant Management has not traditionally been able to cost effectively monitor critical rotating equipment due to the high installation costs of wired vibration monitoring systems.

These and other difficulties experienced with the prior art devices have been obviated in a novel manner by the present invention.

It is, therefore, an outstanding object of some embodiments of the present invention to provide a way to provide a flexible, scalable and low installed cost electric heat trace/vibration control and monitoring system that provides the effective and consistent means of alarming.

It is a further object of some embodiments of the invention to provide a heat trace/vibration monitoring system that is capable of being manufactured of high quality and at a low cost, enjoys minimum installation costs, provides highly effective function, and which is capable of providing a long and useful life with a minimum of maintenance.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION

This invention involves a system for efficiently monitoring a system for controlling the temperature/vibration at numerous points in a large factory such as a petroleum refinery. An embodiment of the invention includes wirelessly monitoring and controlling the operation of an electric heat trace system and may also include monitoring an equipment vibration sensor system. A typical electric heat trace system would include one or more electric heat trace circuits used to apply heat to portions of a fluid transport system (i.e. pipes, pipe connectors, pumps, or vessels). Normally, in such a factory, there are numerous electric heat trace circuits positioned to heat numerous pieces of specific equipment within the factory in order to keep those specific pieces of equipment operating at the correct temperature. Vibration sensors are also commonly used on pieces of specific equipment within a factory in order to keep those specific pieces of equipment operating at the correct vibration. Whenever those specific pieces of equipment are not operating at the proper temperature/vibration, the results can be widespread problems with the entire factory.

The solution is to provide a wireless electric heat trace/vibration control and monitoring system that provides all of the functionality and alarming that operating plants and plant personnel require.

Thus, whenever a specific piece of equipment is not operating at the correct temperature/vibration it becomes very important to know immediately, not only that something isn't right, but also to be able to diagnose the problem immediately in order to immediately take curative steps, ideally before damage is done.

This invention includes four specific pieces of control equipment that have been found to very effectively recognized and diagnose temperature control problems within the factory.

First, there is a central digital computer that monitors and interprets the data produced by the other control equipment. Second, there is a series of temperature/vibration sensors, one of which is located on each of the important specific pieces of equipment in the factory. Each sensor is attached to a wireless communicator (radio) designed to form a node in a MESH communication network. A MESH communicating network is a communication network in which each of the nodes is capable of receiving signals from the nodes around it and then retransmitting that signal to a node around it that moves the signal to a desired direction, in this case, toward the central computer. By adopting this MESH technology, each of the wireless communicators need only have a very short range and therefore have relatively inexpensive and have low power requirements. Thus it becomes practical to have each of the wireless communicators be battery-operated and for the battery life to be relatively long period.

In this way, each of these low-power sensor-radio combinations would be able to communicate with the central computer by passing the signal along a chain of neighboring nodes.

These wireless temperature/vibration sensors can also be used to control the electric heater that heats the specific piece of factory equipment to which the sensor is connected.

Third, the system includes a temperature sensor which monitors the ambient temperature of the factory and feeds that information to the central computer.

Fourth, the system includes a "current transducer" on each of the power cords that provide power to the equipment heaters. The "current transducers" monitor the amount of electricity that is being fed to each of the heaters that are located at the specific pieces of factory equipment. The "current transformers" send a signal back to the central computer that tells the central computer how much current is being used by each of the heaters.

The central computer uses data from these four systems to determine when each piece of factory equipment is not at the correct temperature/vibration and, by comparing the data from the four systems, diagnosis the problem on an instantaneous basis. This fast diagnosis of the problem allows the maintenance crew to address the problem quickly and usually before any permanent damage or disruption has occurred.

BRIEF DESCRIPTION OF THE SEVERAL VIEWS OF THE DRAWING

The character of the invention, however, may best be understood by reference to one of its structural forms, as illustrated by the accompanying drawings, in which.

DETAILED DESCRIPTION OF THE INVENTION

Figure 1:
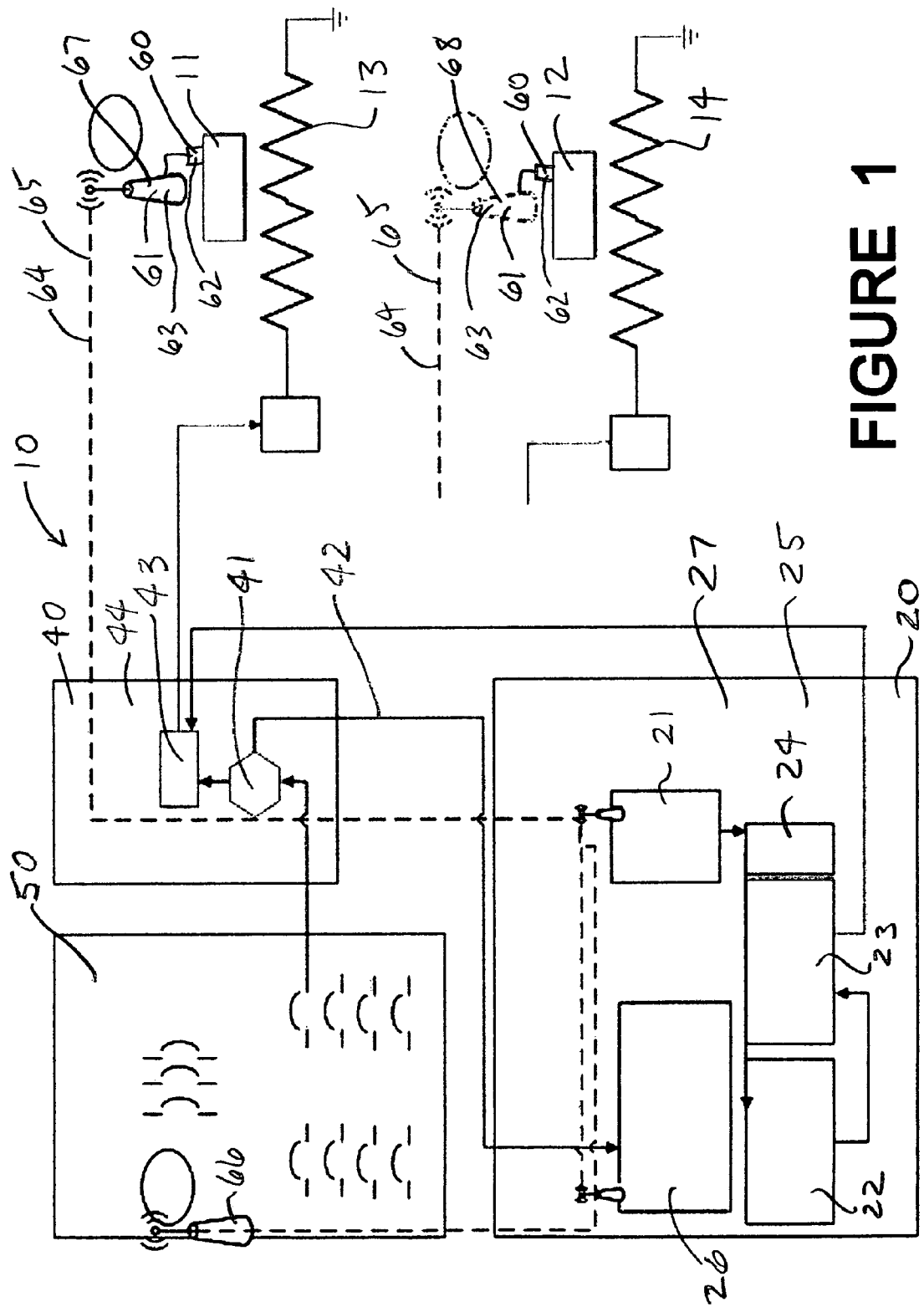
FIG. 1 is a schematic diagram of a first embodiment of the present invention in which the electric current provided to the heating coils and equipment vibration is monitored.

This invention is a wireless electric heat trace/vibration control and monitoring system that provides all of the functionality and alarming that operating plants and plant personnel require, to monitor, and quickly diagnose system failures.

The key elements of the electric heat trace control and monitoring system, and the benefits that customers will realize from its application and use are as follows.

The key elements of the system generally designated by the 10 are the control panel 20, the relay panel 40, and remote sensors 60.

The system 10 operates on a number of pieces of industrial equipment 11 and 12, each of which is heated by heating coil or heater 13 and 14, respectively.

The control panel 20 includes a Wireless "Mesh Network" Infrastructure (Gateway Receiver) 21, such as a Sensicast model GWAY 1020, a Programmable Logic Controller (PLC) 22 (with a 24 vdc output card) 23, such as Allen Bradley Compact Logics L31/Allen Bradley 1769-OB16 Output Module/Allen Bradley 1792-PA2 Power Supply for Compact Logics, a Communications Protocol Translator (Webport) 24, such as Spectrum Webport 4005PSTN56, and a Power Supply/voltage Converter (120 vac to 24 vdc) 25, such as the Allen Bradley 1606XLP 120~24 VDC Power Supply. The control panel 20 also includes a current sensor receiver and transmitter card 26. The control panel 20 also includes necessary terminal strips and Software and configuration 27, such as Rockwell Automation RS Logix 5000, and Rockwell Automation RS Linxs, and ViewON Webport Comm software.

The relay panel 40 includes Current Transducers (0 to 50 amps sensing/0-500 mA sensing and low voltage DC output) 41, Current Transducer and associated circuitry, CT wireless "Mesh Network" transmitters (0 to 10 vdc) 42, such as Sensicast VOLT 1022, and solid-state relays Solid State Relays (30 amp; 280 Vac; single output) 43, such as Allen Bradley 156-A30BB1 Solid State Relay, a Power Supply/Converter (120 vac to 24 vdc) 44, such as Allen Bradley 1606XLP 120~24 VDC Power Supply. The relay panel also includes necessary Terminal Strips.

Electric power is provided to the relay panel 40 from a power source and circuit breaker panel 50.

The remote sensor element 60, particularly in the first embodiment shown in FIG. 1, includes a plurality of remote temperature/vibration devices 61 (RTD's). Each of the remote temperature devices 61 includes a temperature sensor 62 that is capable of measuring an adjacent temperature, a vibration sensor capable of measuring vibration (frequency and/or amplitude) and also includes a MESH network transmitter or transceiver (radio) 63 (in the wireless case) (or a line driver in the hardwired case) capable of communicating a signal representing that temperature/vibration to the controller 22, through a communication link 64. That communication link 64 might be hardwired or might be a wireless communication link 65. One or more of the remote temperature devices (environmental temperature sensor) 66 is installed to measure environmental temperature within the facility, and other remote temperature devices/vibration (equipment temperature/vibration sensors) 67 and 68 are installed to measure the temperature/vibration of specific pieces of equipment (11 and 12 respectively) within the facility. The remote temperature/vibration devices 61 or Wireless "Mesh Network" Temperature/vibration Devices (RTD's to sense the temperature of a pipe, instrument, etc. and a digital wireless transmitter) might be Sensicast TEMP-1022. They might also include a signal amplifier or Wireless "Mesh Network" Router (signal amplifier), such as the Sensicast Router-1022, where are needed. The wireless communication link 64 might also include signal amplifiers where necessary.

Figure 2:
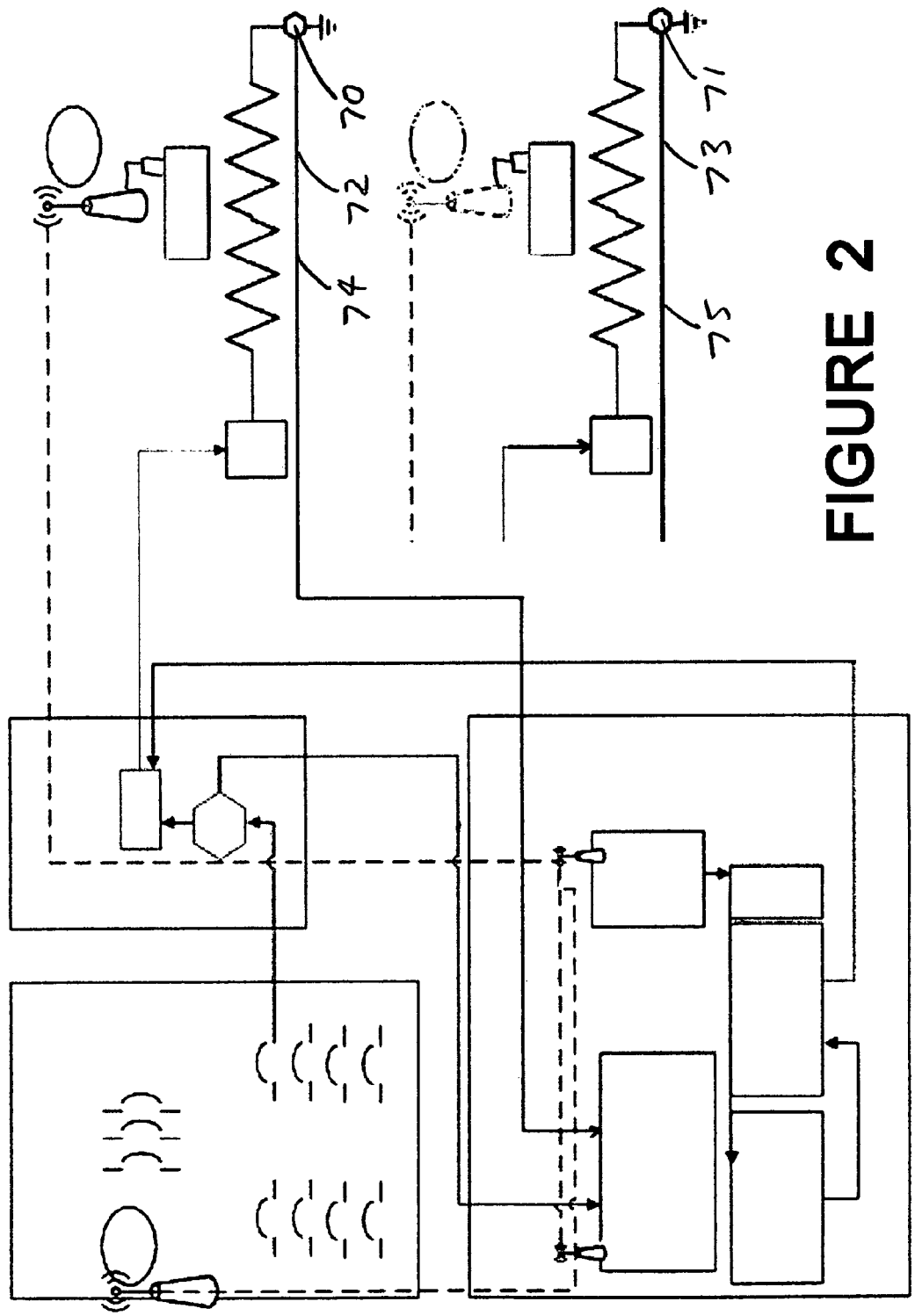
FIG. 2 is a schematic diagram of a second embodiment of the present invention in which the electric current provided to the heating coils and equipment vibration is monitored and the current loss in the loop of the heating coils and equipment vibration is monitored using a hardwired sensor system.
Figure 3:
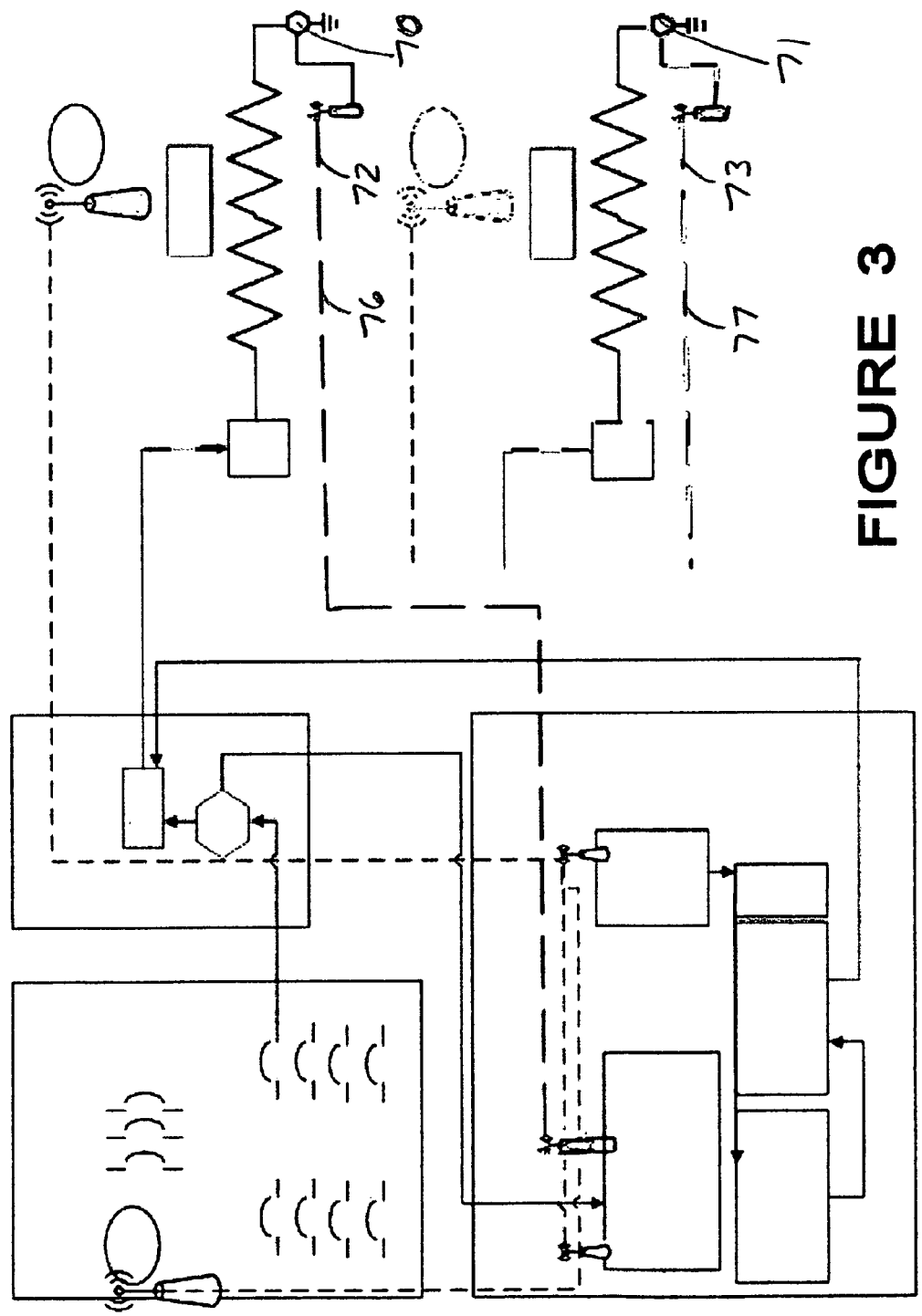
FIG. 3 is a schematic diagram of a third embodiment of the present invention in which the electric current provided to the heating coils and equipment vibration is monitored and the current loss in the loop of the heating coils and equipment vibration is monitored using a wireless sensor system.

In a second and third embodiment of this invention, shown in FIGS. 2 and 3 respectively, the system includes a second current monitoring device 70 and 71 associated with each heater 11 and 12 respectively and adapted to monitor the return current from the heater and provide a signal representing that return current to the controller 22. This allows the system to compare the outgoing and returning currents in the heater circuit and thereby detect current leakage in heater circuit. The second current monitoring device 70 and 71 could be located remotely, for example, near the heater (assuming remote grounding), or could be mounted with the first circuit monitoring device 41 in the relay panel 40 (assuming a complete return line to the relay panel 40). The second current monitoring device 70 and 71 communicates its signal through a communication link 72 and 73 respectively (which could be either a hardwired communication link 74 and 75 respectively or a wireless communication link 76 and 77 respectively) to the controller 22.

How the System works: First, one temperature sensing RTD is placed in a logical place to measure the ambient outside temperature. Then, the remote temperature sensors/vibration are placed onto critical pieces of equipment. The temperature/vibration sensors transmit the temperature and vibration of the individual piece of equipment (typically a pipe or instrument) to the Gateway receiver. This information is "translated" through the Communications Protocol device and is fed into the PLC. The PLC is configured to turn "on" or "off" the individual circuits as required. The PLC has been configured to specific temperatures such that if the sensed remote temperature is below that "setpoint" temperature, the PLC sends a signal to the output card which, in turn sends an "output" (low voltage 24 vdc) signal to the Solid State Relay that completes the high voltage circuit (120 through 277 vac) and turns "on" the electric heat trace circuit.

The circuit, when "on", draws a known current or amperage. This is done through the use of CT's, or current transformers. The CT's are mounted in a panel, and the power wiring that is connecting the heat trace power (120 to 277 vac) from the Main Distribution Power Panel to the electric heat trace circuits, runs physically through the CT's. The CT's sense the amperage of the individual circuit and in turn send out a low voltage dc signal. This low voltage signal is either wired into the wireless transmitting devices which transmit the individual amperage circuit draw back to the Gateway and then is then "translated" through the Communication Protocol device into the PLC; or, wired directly back to an input card connected to the PLC. The PLC has been configured to send out alarms if the actual current falls below the "set" or configured amperage range of that individual circuit. The PLC has also been configured to send out alarms if the temperature of that monitored circuit is below a "failsafe" point, whether or not the circuit is in the "on" condition.

Additionally, when a circuit is in the "on" state and is drawing amperage, an additional CT is used to measure milliamp leakage, or "ground fault" through the circuit. In the wiring system, the CT and associated circuitry constantly monitor electricity flowing in a circuit, to sense any loss of current. If the current flowing through the circuit differs by a small amount from that returning, the PLC has been configured to send out an alarm and/or to quickly switch off power to that circuit. The CT and PLC interrupt power to prevent an accidental shock from occurring.

Examples of a system in various states of condition and how the alarming would perform are as follows.

Condition A: The remote sensors' set points are set at 50 deg F. and are reading 48 deg F. The ambient sensor is reading 51 deg F. The current draw for all CT's are at 0 amps. Electric heat trace system is Off. No alarm because the system has been configured NOT to alarm if the reading of the ambient sensor is at or above the set points of the remote sensors.

Condition B: The remote sensors' set points are set at 50 deg F. and are reading 52 deg F. The ambient sensor is reading 48 deg F. The current draw for all CT's are at 0 amps. Electric heat trace system is Off. No alarm because the system has been configured NOT to alarm if the reading of the remote sensors are at or above their set points regardless of the ambient sensor reading.

Condition C: The remote sensors' set points are set at 50 deg F. and are reading 39 deg F. The ambient sensor is reading 43 deg F. The current draw for all CT's is being read at levels above their configured set points. Electric heat trace system is ON. No alarm because the system has been configured to have a "yellow alert" alarm if the remote sensor readings fall below 36 deg F.

Condition D: The remote sensors' set points are set at 50 deg F. and are reading 39 deg F. The ambient sensor is reading 43 deg F. The current draw for all CT's is being read at levels above their configured set points. Electric heat trace system is ON. No alarm because the system has been configured to have an alarm if the remote sensor readings fall below 36 deg F.

Condition E: The remote sensors' set points are set at 50 deg F. and are reading 34 deg F. The ambient sensor is reading 38 deg F. The current draw for all CT's is being read at levels above the configured setponts. Electric heat trace system is ON. ALARM state because the system has been configured to have an alarm if the remote sensor readings fall below 36 deg F.

Condition F: The remote sensors' set points are set at 50 deg F. and are reading 37 deg F. The ambient sensor is reading 38 deg F. The current draw for all CT's is being read at levels above 0, except for one circuit, which is reading below the configured set point. Electric heat trace system is ON. ALARM state because the system has been configured to have an alarm if any of the CT readings fall below the configured set points, AND the ambient sensor is reading below the configured set point (50 deg F.) of the remote temperature sensors.

Condition G: The remote sensors' set points are set at 50 deg F. and are reading 37 deg F. The ambient sensor is reading 38 deg F. The current draw for all CT's is being read at levels above 0. Electric heat trace system is ON. One circuit is reading 200 mA ground leakage through the "ground fault" CT ALARM state and one circuit has been turned off because the system has been configured to have an alarm and turn off the individual circuit if an individual ground fault CT readings are above the configured set points, AND the ambient sensor is reading below the configured set point (50 deg F.) of the remote temperature sensors.

The alarms of this system can be as simple as a warning light, bell or buzzer. Or the alarms of this system can be as complex as sending out broadcast emails, text messages, or voice recordings to mobile telephones.

Summary: The wireless electric heat trace monitoring and control system will benefit clients through the following. It will enable the customer to increase profits through more "run time" with out disruption from emergency situations created by non-functional electric heat trace systems. It will improve human resource allocations because trained, technical personnel will not be called on to "fix" non-working electric heat trace systems. It will provide "ensurance" protection for equipment from freezing. It will save the customer time and money due to significantly reduced installation costs because it is a wireless system. It will provide a cost effective means to control and monitor existing electric heat trace systems by the addition of a wireless control and monitoring system. It will provide data for trending—in order to predict when a system, or a portion of the electric heat trace system may fail—creating an opportunity for Proactive Maintenance.

The primary objective that drove the present product and solution development, was to increase the awareness level, on a plant-wide basis, of any impending operational issues with these typical applications BEFORE they create a significant negative impact upon the plant.

The present inventors have created a flexible, portable, low-installed-cost method of providing continuous vibration (and temperature) monitoring via a wireless vibration and temperature sensor as part of an overall PLC/PC/Web based system. With the recognition of how important properly functioning rotating equipment (pumps, fans, blowers, etc.) can be to the operations and profitability of a plant, and with the knowledge that even a properly specified and installed piece of equipment can develop problems over time, monitoring the "health" of this equipment through a continuous vibration and temperature monitoring system is critical.

D. Monitoring System: The objective of a vibration and temperature monitoring system is simple—to alert plant personnel BEFORE a problem occurs that could cause a catastrophic failure, interrupt critical process availability, or diminish plant revenue generation. At the heart of the solution is the integration of all of the necessary information that plant personnel will require in order resolve equipment issues. The Monitoring systems currently available wired systems can be as primitive as a simple LED on the end of an electric heat trace circuit (indication of voltage at the LED), to a sophisticated pipe temperature-sensing and breaker current-sensing multiple circuit system. Most systems fall somewhere in between, with the most common having local visual indication as the primary method of alarm. Although local visual indication is the most common alarming method, it is also the least effective.

No matter the complexity or the simplicity of today's control and monitoring systems, they all suffer from one inherent drawback, and that is that they must all be "hard wired." Hard wired monitoring systems are permanent "in place" systems and require the same infrastructure and installation issues (electrical code requirements, installation labor, etc) as does any electrical project. These costs are significant when included as part of the original electrical heat trace project, but they grow by a factor of 2× to 3× when a Monitoring System is added after an initial electric heat trace system has been installed. Because of the cost of installation of these monitoring systems (whether as part of the original project, or when considered as an additional "ensurance" measure later), many of the systems get reduced in size and/or capabilities, thus reducing their overall effectiveness, and decreasing their ability to meet the intended objective—to warn personnel BEFORE a problem occurs.

The Problem: How to provide a flexible, scalable and low installed cost vibration and temperature monitoring system that provides the effective and continuous means of alarming?

The Solution: A WIRELESS vibration and temperature monitoring system that provides all of the functionality and alarming that operating plants and plant personnel require. The solution is the present invention.

The key elements of the preferred embodiment of the present vibration and temperature monitoring system, and the Benefits that customers will realize from its application and use.

Key Elements of the preferred embodiment: the Control Panel includes, 1. a Wireless "Mesh Network" Infrastructure (Gateway Receiver), e.g. Spinwave, 2. A Programmable Logic Controller (PLC), e.g., Unitronics, 3. a Communications Protocol Translator (Webport), e.g., Unitronics PLC model (with embedded Webport), 4. Power Supply/Converter (120 vac to 24 vdc), e.g., Allen Bradley 1606XLP 120-24 VDC Power Supply, and 5. Terminal Strips, and 6. Software and configuration, e.g., Visilogic.

The Remote Sensors include: 1. A Wireless "Mesh Network" Temperature/vibration Device (Accelerometer and temperature sensor to measure the vibration (g's) and temperature (degrees F.) of rotating equipment (and a digital wireless transmitter), e.g., Spinwave and PCB's IMI industrial sensors, and 2. Wireless "Mesh Network" Router (signal amplifier), e.g., Spinwave.

Spinwave refers to products and services of Spinwave Systems, Inc., 235 Littleton Road, Westford, Mass. 01886. Unitronics refers to products and services of Unitronics Inc., 1 Batterymarch Park, Quincy, Mass. 02169. Allen-Bradley refers to products and services of Allen-Bradley Rockwell Automation, Inc. Visilogic refers to products and services of Unitronics Inc., 1 Batterymarch Park, Quincy, Mass. 02169. PCB's IMI refers to products and services of IMI Sensors, 3425 Walden Avenue, Depew, N.Y. 14043, a division of PCB Piezotronic, Inc.

How the System works: First, the vibration/temperature sensor is mounted directly (via various mounting methods) to a member of the rotating equipment that is in significantly impacted by any change in vibration or temperature from the rotating component itself. As an example, on a pump application, wherein the pump impeller is driven by an electric motor, the sensor would be attached to the pump housing near the impeller. Any change in the dynamic balance of the impeller would impact the vibration sensed at the pump housing around the impeller. The sensor would measure that change and transmit the data back to the Gateway/PLC and if the vibration (g's) were higher than the user-defined limits, an alarm would be generated.

Initially, the system would need to be installed, and baseline "acceptable" ranges would be determined by the user. Then, values would be derived, again by the user and/or manufacturer of the rotating equipment, that would be considered "unacceptable", and these values would be configured into the PLC to act as alarm setpoints. Additionally, a "rate of change" value would be configured that would generate alarms if too great of a change in vibration were measured over too short of a time interval. This would also indicate that a serious change in equipment "health" was imminent.

All of the pertinent data involving each circuit (vibration, temperature, sensor and system communication) is sent via the PLC embedded "webport" to an IP address that is viewable from any place on the client LAN. This critical operating information is synthesized into a one page, easy-to-read application. This page will show any existing and unacknowledged alarms and all alarm setpoints. The key benefit of this webpage to the client is that it takes all critical information and synthesizes it into one simple format for instantaneous review by anyone in the facility.

Finally, all data is recorded at pre-specified intervals (default is five minutes) onto an SD card that is part of the PLC. This information is then exported every six hours to both a client specified local PC or local server, and to a server at central management site. This data is available for client and/or central management review for circuit trending, fault analysis, troubleshooting, etc.

Summary: The present wireless vibration and temperature monitoring system will benefit clients through the following: 1. enable the customer to increase profits through more "run time" without disruption from emergency situations created by failed rotating equipment, 2. improve human resource allocations because trained, technical personnel will not be called on in an emergency to "fix pumps, fans, etc. 3. save the customer time and money due to significantly reduced installation costs because it is a wireless system, 4. provide a cost effective means to control and monitor existing rotating equipment by the addition of a wireless control and monitoring system, and 5. provide data for trending—in order to predict when a device may fail—creating an opportunity for Proactive Maintenance.

It should be understood that there are benefits to simultaneously and continuously (or effectively simultaneously and continuously, using frequent measurements) monitoring the temperature and vibration of a piece of equipment. Sometimes, the combined information about temperature and vibration can spot and diagnose problems that would not be otherwise possible.

While it will be apparent that the illustrated embodiments of the invention herein disclosed are calculated adequately to fulfill the object and advantages primarily stated, it is to be understood that the invention is susceptible to variation, modification, and change within the spirit and scope of the subjoined claims. It is obvious that minor changes may be made in the form and construction of the invention without departing from the material spirit thereof. It is not, however, desired to confine the invention to the exact form herein shown and described, but it is desired to include all such as properly come within the scope claimed.

What I claim as my invention is:

1. A system for monitoring and controlling the temperature and vibration of various pieces of equipment in a facility, comprising:
   a.) a central digital computer that monitors and interprets data provided to it,
   b.) a MESH communication network comprised of a plurality of wireless communicators (radios), designed to form a node in the MESH communication network, wherein the MESH communicating network is a communication network in which each of the nodes is capable of receiving signals from the nodes around it and then retransmitting that signal to a node around it that moves the signal to a desired direction, in this case, toward the central digital computer, and feeds the signal to the central digital computer,
   c.) A plurality of electric heat trace circuits each of which is associated with a piece of equipment in the facility, and adapted to heat that piece of equipment,
   d.) a plurality of temperature and vibration sensors, one of which is associated with and configured to measure the temperature and vibration of one of the pieces of equipment in the facility, wherein each sensor is configured to provide a signal representing the temperature and vibration of the piece of equipment to which each sensor is associated, to a wireless communicator (radio) in the MESH communication network, wherein each temperature and vibration sensor can also be used to control the electric heat trace circuit that heats the piece of equipment and provides the vibratory state of the piece of equipment to which the sensor is associated,
   e.) an ambient temperature sensor configured to monitor the ambient temperature of the facility and feed a signal representing the ambient temperature of the facility to the central digital computer wherein, the ambient temperature sensor is thermally independent and isolated from the equipment, and
   f.) a plurality of current transducers, one of which is associated with each of the electric heat trace circuits and which sends a signal representing the amount of energy being used by the electric heat trace circuit to the central computer,
   wherein the central computer uses the data it receives from the equipment temperature and vibration sensors, the ambient temperature sensor, and the current transducers to determine and announce when each piece of factory equipment is not at the correct temperature and vibration.

2. A system as recited in claim 1, wherein the system uses the combined temperature and vibration information to diagnose that the equipment is not at the correct temperature and vibration, and displays that fact.

3. A system as recited in claim 1, wherein the system uses the combined temperature and vibration information to diagnose the reason why the equipment is not at the correct temperature and vibration, and displays the reason.

4. A system as recited in claim 1, wherein the system monitors current loss associated with each electric heat trace circuit and provides that information to the central digital computer.

5. A system for monitoring the vibration of various pieces of equipment in a facility, comprising:
   a.) a central digital computer that monitors and interprets data provided to it,
   b.) a MESH communication network comprised of a plurality of wireless communicators (radios) designed to form a node in the MESH communication network, wherein the MESH communicating network is a communication network in which each of the nodes is capable of receiving signals from the nodes around it and then retransmitting that signal to a node around it that moves the signal in a desired direction, in this case, toward the central digital computer, and feeds the signal to the central digital computer,
   c.) A plurality of vibration sensors, one of which is associated with and adapted to measure the vibration of one of the pieces of equipment in the facility, wherein each sensor is adapted to provide a signal representing the vibration of the piece of equipment to which the sensor is associated, to a wireless communicator (radio) in the MESH communication network,
   wherein the central computer uses the data it receives from the vibration sensors to determine and announce when each piece of factory equipment is not operating correctly, and displays that fact.

6. A system as recited in claim 5, wherein the central digital computer is structured and programmed to monitor the vibration of the equipment, and, by comparing the data from the vibration sensors to diagnose that the equipment is not at the correct vibration, and to display that fact.

7. A system as recited in claim 5, wherein the central digital computer is structured and programmed to monitor the vibration of the equipment, and, by analyzing the data from the vibration sensors to diagnose the reason why the equipment is not at the correct vibration, and to display that reason.

8. A system as recited in claim 5, wherein the central digital computer is structured and programmed to monitor the vibration of the equipment and to store historical information about the vibration of a piece of equipment in a storage device, and, by comparing the historical data with data from the vibration sensors to diagnose that the equipment is not at the correct vibration, and to display that fact.

9. A system as recited in claim 5, wherein the central digital computer is structured and programmed to monitor the vibration of the equipment and to store historical information about the vibration of a piece of equipment in a storage device, and, by comparing the historical data with data from the vibration sensors to diagnose the reason why the equipment is not at the correct vibration, and to display that reason.

10. A system for monitoring and controlling the temperature and vibration of a portion of a stationary fluid transport system in a facility, comprising:
    a.) a central digital computer that monitors and interprets data provided to it,
    b.) a MESH communication network comprised of a plurality of wireless communicators (radios), designed to form a node in the MESH communication network, wherein the MESH communicating network is a communication network in which each of the nodes is capable of receiving signals from the nodes around it and then retransmitting that signal to a node around it that moves the signal in a desired direction, in this case, toward the central digital computer, and feeds the signal to the central digital computer, c.) A plurality of stationary electric heat trace circuits each of which is associated with a portion of the stationary fluid transport system in the facility, and adapted to heat that portion of the stationary fluid transport system, d.) a plurality of temperature and vibration sensors, one of which is associated with and configured to measure the temperature and vibration of one of the portions of the stationary fluid transport system in the facility, wherein each sensor is configured to provide a signal representing the temperature and vibration of the portion of the stationary fluid transport system to which each sensor is associated, to a wireless communicator (radio) in the MESH communication network, wherein each temperature and vibration sensor can also be used to control the stationary electric heat trace circuit that heats the portion of the stationary fluid transport system and provides the vibratory state of the portion of the stationary fluid transport system to which the sensor is associated, e.) an ambient temperature sensor configured to monitor the ambient temperature of the facility and feed a signal representing the ambient temperature of the facility to the central digital computer wherein, the ambient temperature sensor is thermally independent and isolated from the portions of the stationary fluid transport system, f.) a plurality of first current transducers, one of which is associated with each of the stationary electric heat trace circuits and which sends a signal representing the amount of energy being used by the stationary electric heat trace circuit to the central computer, g) a plurality of second current transducers, one of which is associated with each of the electric heat trace circuits and which sends a signal which is used by the central digital computer to determine current loss associated with each stationary electric heat trace circuit to the central digital computer, wherein the central computer uses the data it receives from the equipment temperature and vibration sensors, the ambient temperature sensor, and the current transducers to determine and announce when each portion of the stationary fluid transport system is not at the correct temperature and vibration.

* * * * *